United States Patent
Yamamoto

(10) Patent No.: US 6,704,570 B2
(45) Date of Patent: Mar. 9, 2004

(54) EXTRA COMMUNICATION SERVICE SYSTEM WITH TIME DIFFERENTIAL CORRECTED

(75) Inventor: Takashi Yamamoto, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/382,255

(22) Filed: Aug. 24, 1999

(65) Prior Publication Data

US 2003/0073428 A1 Apr. 17, 2003

(30) Foreign Application Priority Data

Oct. 30, 1998 (JP) .......................................... 10-310362

(51) Int. Cl.$^7$ ................................................ H04Q 7/20
(52) U.S. Cl. .................... 455/432.1; 455/414.1
(58) Field of Search .................. 455/403, 18, 417, 455/456, 435.1, 432.1, 432.3, 433, 414.1, 414.2, 414.3; 368/47

(56) References Cited

U.S. PATENT DOCUMENTS 5,673,256 A * 9/1997 Maine .................... 340/825.49
6,181,935 B1 * 1/2001 Gossman et al. ........... 455/432
6,223,050 B1 * 4/2001 Roberts, Jr. .................. 368/47

FOREIGN PATENT DOCUMENTS

JP 4-24815 1/1992
JP 09081639 3/1997
SE WO-98/06212 A1 * 2/1998 ............ H04M/3/42

* cited by examiner

Primary Examiner—Vivian Chin
Assistant Examiner—Lewis G. West
(74) Attorney, Agent, or Firm—Katten Muchin Zavis Rosenman

(57) ABSTRACT

An extra communication service system is disclosed, in which the area of the called party is provided with an extra service according to a set time while correcting the time differential with the area of the called party. The subscriber can enjoy various extra services in accordance with the time based on the standard time of the destination area. When registering the position of a mobile station 1-5 in a visitor mobile service switching center 1-4, a gateway location register 1-3 requests a home location register 1-2 to read the subscriber data of the mobile station. The home location register 1-2 determines the time differential from the common carrier number information or the like of the gateway location register, produces a roaming time table with the time differential corrected from the time set in an original time table 1-7 for the extra services, and transmits it to the gateway location register. The communication network provides the extra service in accordance with the roaming time table.

6 Claims, 4 Drawing Sheets

EXTRA COMMUNICATION SERVICE SYSTEM WITH TIME DIFFERENTIAL CORRECTED

BACKGROUND OF THE INVENTION

1. Field of the Invention

The present invention relates generally to a communication system such as a telephone system and, in particular, to an extra communication service system for providing extra services at a set time by correcting for a time differential which may exist among areas of the destinations of the communication.

A conventional extra service, in response to a set time, is available in which, for a message about the connecting work by the operator or the like, a different route than for daytime is registered for an incoming call during a preset nighttime zone when the operator is absent, and thus the message is routed by the network in accordance with the set time.

Other extra services available at a set time include an answer phone service for automatically registering a presence or an absence at a set time, a call forwarding service for transferring or not transferring or changing the destination according to a set time and a service for preventing an incoming call or an outgoing call in accordance with a set time.

A communication network for providing extra services to subscribers in accordance with a set time includes a time table for storing the set time for each extra service required by each subscriber, and provides an extra service based on the time stored in the time table.

A reference time, however, is based on the standard time used in the communication network providing the extra service. An extra service is not provided with a corrected time differential in the case where a subscriber receiving the extra service has moved to a distant area in which there is a time differential from the reference time.

For this reason, a subscriber receiving an extra service according to a set time is required to set the time and register or change the extra service only based on the standard time used by the network providing the service.

With the recent progress of globalization and multiplication of communication services, the barriers and limitations of time, place and destination have been disappearing to such an extent that any one at any place can send a message by telephone or conduct data communication by simple means at any time, at any place and with any person. This simplicity, however, has given rise to the following problems.

In the case where there is a time differential with the area of the other party, the calling party generally rings up the other party taking the current time zone at the receiving end into consideration. When the other party using a mobile unit and a universal number moves to an area of a different time differential, however, the calling party may call the other party without the knowledge of the existence of a different time differential. On the other hand, the communication network provides communication services regardless of the time differential. Especially in the event that the time at the receiving end is midnight, for example, the called party will be annoyed by the ringing. Even in the case where the night time call forwarding service, the answer phone service or the incoming call restriction service is registered, the subscriber is required to set the time in accordance with the standard time of the home communication network of the subscriber. This is very troublesome.

SUMMARY OF THE INVENTION

An object of the present invention is to provide an extra communication service system in which the time differential between the standard time of a destination area and the standard time of the home communication network is corrected in the communication network, and the subscriber can enjoy various extra services according to the time based on the standard time of the destination area.

According to one aspect of the invention, there is provided an extra communication service system with a time corrected by a time differential for a communication system providing extra services according to a set time between communication networks using different standard times, comprising means for determining the time differential between a home communication network of the subscriber that has registered the extra service and the destination communication network based on the communication network ID number information exchanged between the home communication network and the destination communication network of the subscriber, means for setting the time in an extra service time table in the subscriber data stored in a home location register of the home communication network, means for producing and holding a time table according to the standard time of the destination communication network corrected based on the time differential with the destination communication network, and means for changing the time table according to the standard time of the destination communication network in response to a time table change request from the destination communication network, wherein the extra service at a set time is provided based on the time table of the destination communication network according to the standard time thereof.

According to a second aspect of the invention, there is provided an extra communication service system with a time corrected by a time differential, wherein the home communication network of the subscriber who has registered the extra service includes means for determining the time differential with the destination communication network, means for producing and holding a time table based on the standard times of the destination communication network with the time differential corrected, and means for transmitting a time table based on the standard time of the destination communication network to the destination communication network.

According to a third aspect of the invention, there is provided an extra communication service system with a time corrected by a time differential, wherein the destination communication network of the subscriber includes means for determining the time differential with the home communication network of the subscriber who has registered the extra service, means for producing and holding a time table based on the standard time of the destination communication network with the time differential corrected, and means for transmitting the time table based on the standard time of the destination communication network with a corrected time differential to the home communication network of the subscriber.

According to a fourth aspect of the invention, there is provided a communication system for providing extra services corresponding to a set time between communication networks using different standard times, comprising:

a general-purpose location register having stored therein an extra service time table in the subscriber data stored in the home location register of the communication network with the time differential corrected to the time based on the international standard time, wherein each communication network includes means for reading the time table according to the international standard time stored in the general-purpose register, and based on time differential between the standard time used in each communication network and the international standard time, correcting the time set in the time table according to the international standard time to the time based on the standard time used in each communication network, and wherein each communication network provides the extra services corresponding to the set time based on the time table with the time differential corrected to the standard time of each communication network.

According to a fifth aspect of the invention, there is provided an extra communication service system with a corrected time differential, in which the means for determining the time differential with the destination communication network based on the communication network ID number information described in the first aspect above is replaced with means for receiving the time information from the clock function built in a mobile unit in the destination communication network and determining the time differential with the standard time of the destination communication network based on the time information.

According to a sixth aspect of the invention, there is provided an extra communication service system, in which the destination communication network includes means for determining the time differential from the time information of the clock function built in the mobile unit and transmitting a signal for correcting the time differential of the clock function built in the mobile unit.

BRIEF DESCRIPTION OF THE DRAWINGS

The above object and features of the present invention will be more apparent from the following description of the preferred embodiments when read in conjunction with the accompanying drawings, wherein.

DESCRIPTION OF THE PREFERRED EMBODIMENTS

A communication system for providing a roaming service among mobile communication networks will be described below as an embodiment of the present invention. The roaming service can provide service to the subscriber not only in the service area of the communication network (home communication network) of the common carrier with which the subscriber has signed an agreement but also in the service area of the communication network (destination communication network) of a common carrier with which the subscriber has not signed an agreement.

Figure 1:
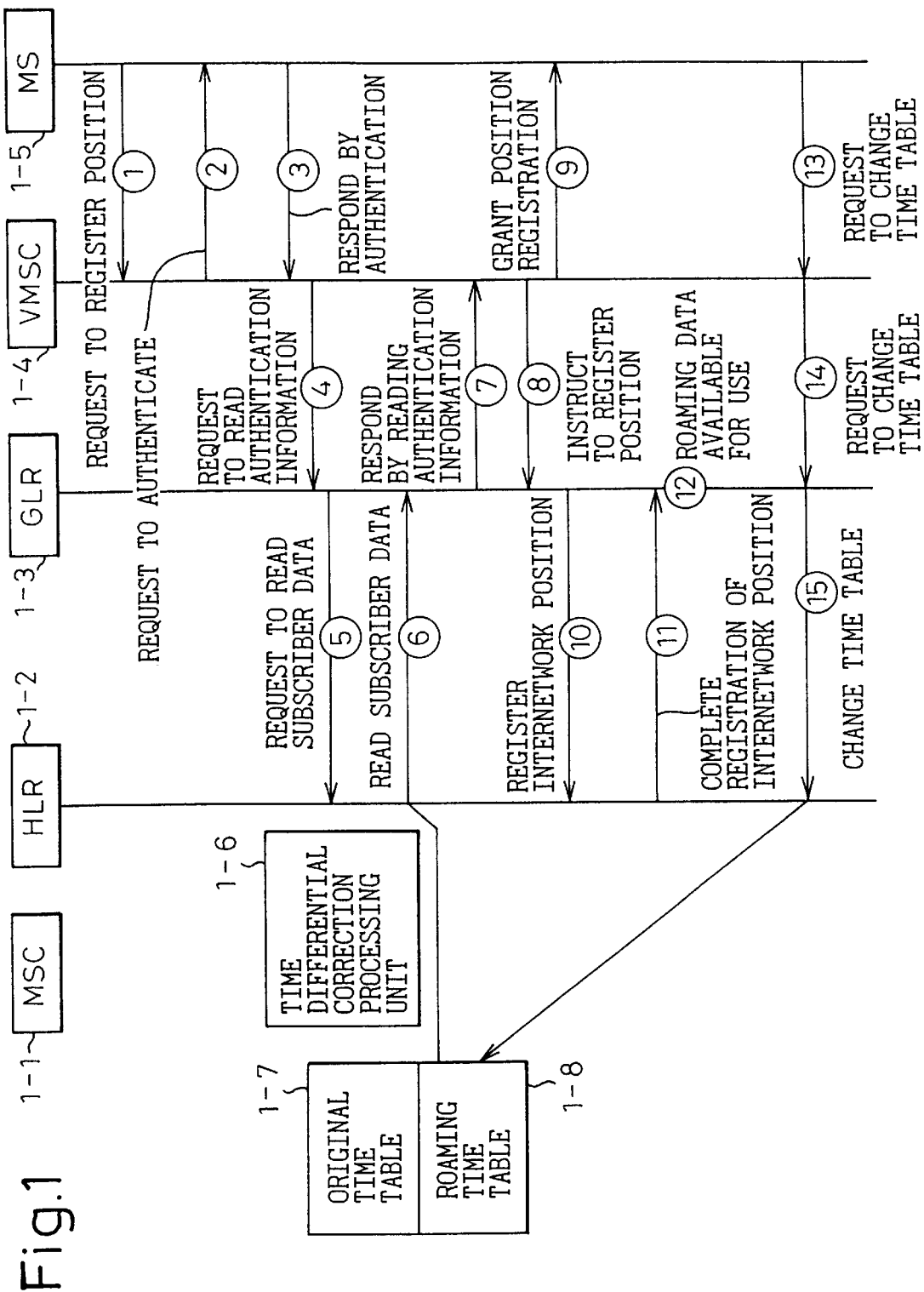
FIG. 1 is a diagram showing message sequences for time differential correction between mobile communication networks according to an embodiment of the invention.

FIG. 1 is a diagram showing a message sequence for time differential correction between the mobile communication networks according to an embodiment of the invention. In FIG. 1, numeral 1-1 designates a mobile service switching center (MSC), numeral 1-2 a home location register (HLR), numeral 1-3 a gateway location register (GLR), numeral 1-4 a visitor mobile service switching center (VMSC), numeral 1-5 a mobile station (MS), numeral 1-6 a time differential correction processing unit, numeral 1-7 an original table, and numeral 1-8 a roaming time table.

The home location register (HLR) 1-2 for the home communication network stores therein subscriber data of the mobile station (MS) 1-5 accommodated in the home network, and the mobile station (MS) 1-5 can normally receive the communication service even in a service area for other common carriers.

The mobile station (MS) 1-5, when moving to a different service area and requires the position registration, requests the visitor mobile service switching center (VMSC) 1-4 to register the location (sequence 1). In FIG. 1, the sequence numbers are indicated in the circles.

In order to check whether the mobile station (MS) 1-5 that has sent a request for position registration thereto is a legitimate mobile station or not, the VMSC 1-4 transmits an authentication request thus requesting the authentication information stored in the mobile station (MS) 1-5 (sequence 2).

In response to the authentication request, the mobile station (MS) 1-5 transmits the authentication information of the mobile station 1-5 to the VMSC 1-4 as an authentication response (sequence 3). The VMSC 1-4 requests the gateway location register (GLR) 1-3 to read the detailed information about the authentication information of the mobile station 1-5 (sequence 4).

The GLR 1-3 requests the home location register (HLR) 1-2 having stored therein the subscriber data of the mobile station 1-5 to read the subscriber data of the particular authentication information (sequence 5).

In the process, the communication network ID number information such as the common carrier number information of the GLR 1-3 is transmitted to the HLR 1-2. The time differential correction processing unit 1-6 of the HLR 1-2 refers to the time differential management data table managed by the HLR 1-2 based on the communication network ID number information of the GLR 1-3 and determines the time differential information thereby to carry out the time differential correction process.

The time differential correction processing unit 1-6 produces a time table with the time differential corrected from the original time table 1-7 in which the extra service at a set time is registered by the subscriber, adds it as a roaming time table 1-8, and transmits the contents set in the roaming time table 1-8 together with the subscriber data to the GLR 1-3 (sequence 6).

The GLR 1-3 holds the roaming time table 1-8 transmitted thereto from the HLR 1-2. Specifically, the GLR 1-3 holds a time table of the standard time of the VMSC.

Also, the GLR 1-3 retrieves the regular authentication information from the subscriber data received, and transmits the retrieved authentication information to the VMSC 1-4 (sequence 7).

The VMSC 1-4 compares the authentication information stored in the mobile station 1-5 with the regular authentication information read from the HLR 1-2.

The VMSC 1-4, after confirming the legitimacy of the mobile station (MS) 1-5, instructs the GLR 1-3 to register the position of the mobile station 1-5 (sequence 8) while at the same time informing the mobile station 1-5 that the position registration request has been granted (sequence 9).

The GLR 1-3 performs the internetwork position registration by transmitting the roaming number and the number of the GLR 1-3 to the HLR 1-2 having stored therein the subscriber data of the roaming mobile stations (sequence 10).

The HLR 1-2 sets a link (relation) for the subscriber data with the destination GLR 1-3, and upon complete internetwork position registration, notifies the GLR 1-3 (sequence 11).

After the GLR 1-3 receives the notification on the completion of the internetwork position registration, the subscriber data held in the GLR 1-3 becomes usable as the roaming subscriber data (sequence 12).

When the mobile station 1-5 requests the contents of the time table to be changed (sequence 13), the VMSC 1-4 transmits a request to the GLR 1-3 to change the time table (sequence 14).

The GLR 1-3 updates the time table held therein, and transmits the information giving an instruction to the HLR 1-2 for changing the time table (sequence 15). The HLR 1-2 updates the roaming time table 1-8.

Figure 2:
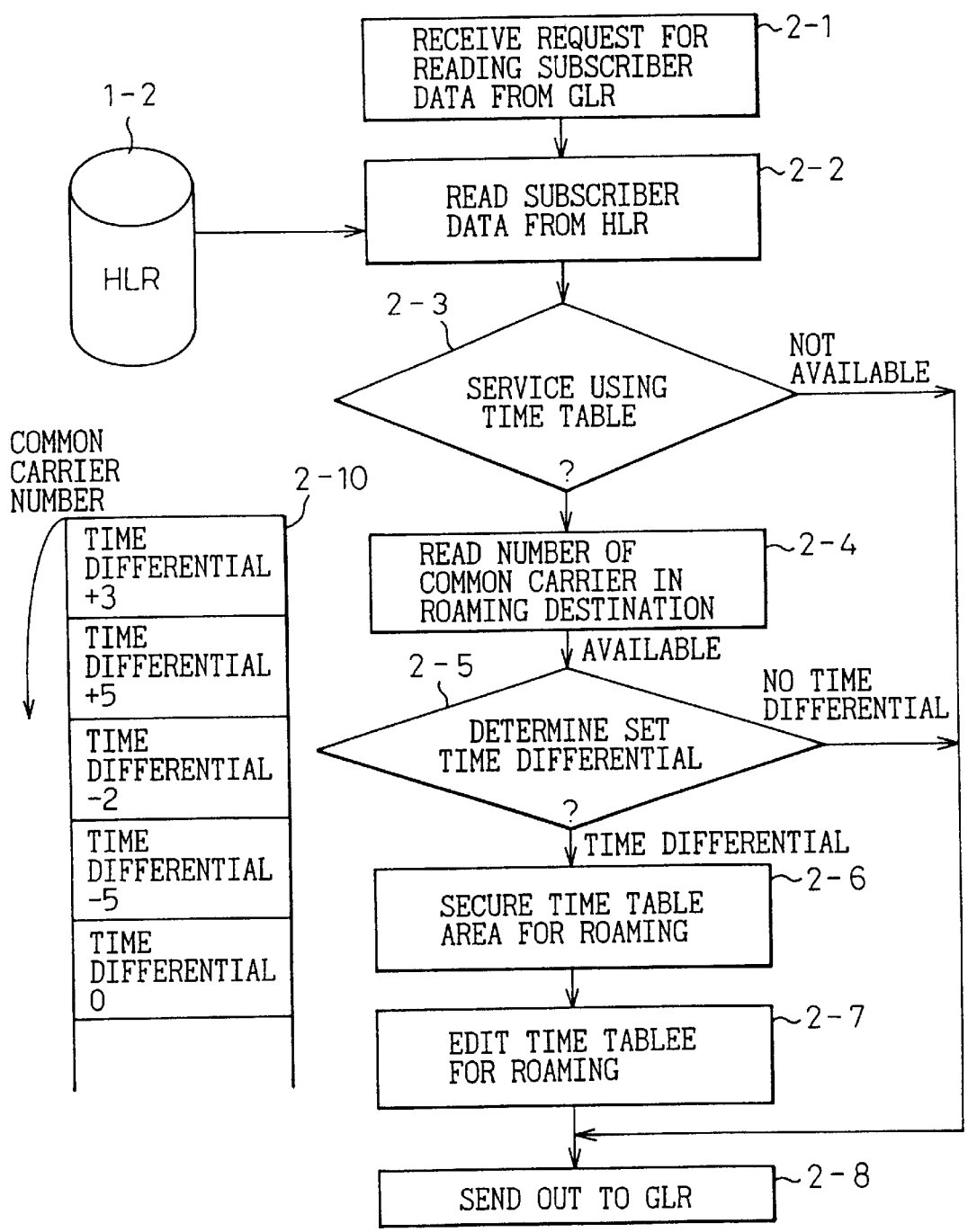
FIG. 2 is a diagram showing the flow of the process for time differential correction between mobile communication networks according to an embodiment of the invention.

FIG. 2 is a diagram showing the flow of the process for correcting the time differential between mobile communication networks according to an embodiment of the present invention. The process for time differential correction shown in FIG. 2 is executed between the sequence 5 and the sequence 6 in FIG. 1.

Upon receipt of a request for reading the subscriber data from the GLR while in the home communication network (2-1), the subscriber data is read out from the HLR (2-2), and it is judged with reference to the subscriber data whether the service for using the time table is registered or not (2-3).

In the case where the service for using the time table is not registered, the process is terminated simply by transmitting the subscriber data read to the GLR (2-8) without performing the time differential correction.

In the case where the service for using the time table is registered, on the other hand, the communication network ID number information of the common carrier or the like for the roaming destination is read out (2-4), the time differential management data table 2-10 is searched from the communication network ID number information, and thus a set time differential is determined (2-5). The time differential management data table 2-10 has stored therein the time differential with the home communication network for each communication network ID number information such as the common carrier number of the roaming destination.

In the case where the set time differential is zero, i.e. in the absence of the time differential, the subscriber data read out are transmitted to the GLR without executing the time differential correction process (2-8) and the process is terminated.

In the presence of a time differential, on the other hand, a roaming time table area is secured in the HLR (2-6), the time differential is corrected thereby to edit a roaming time table (2-7), and the subscriber data including the roaming time table is transmitted to the GLR (2-8). Thus the process is terminated.

Figure 3:
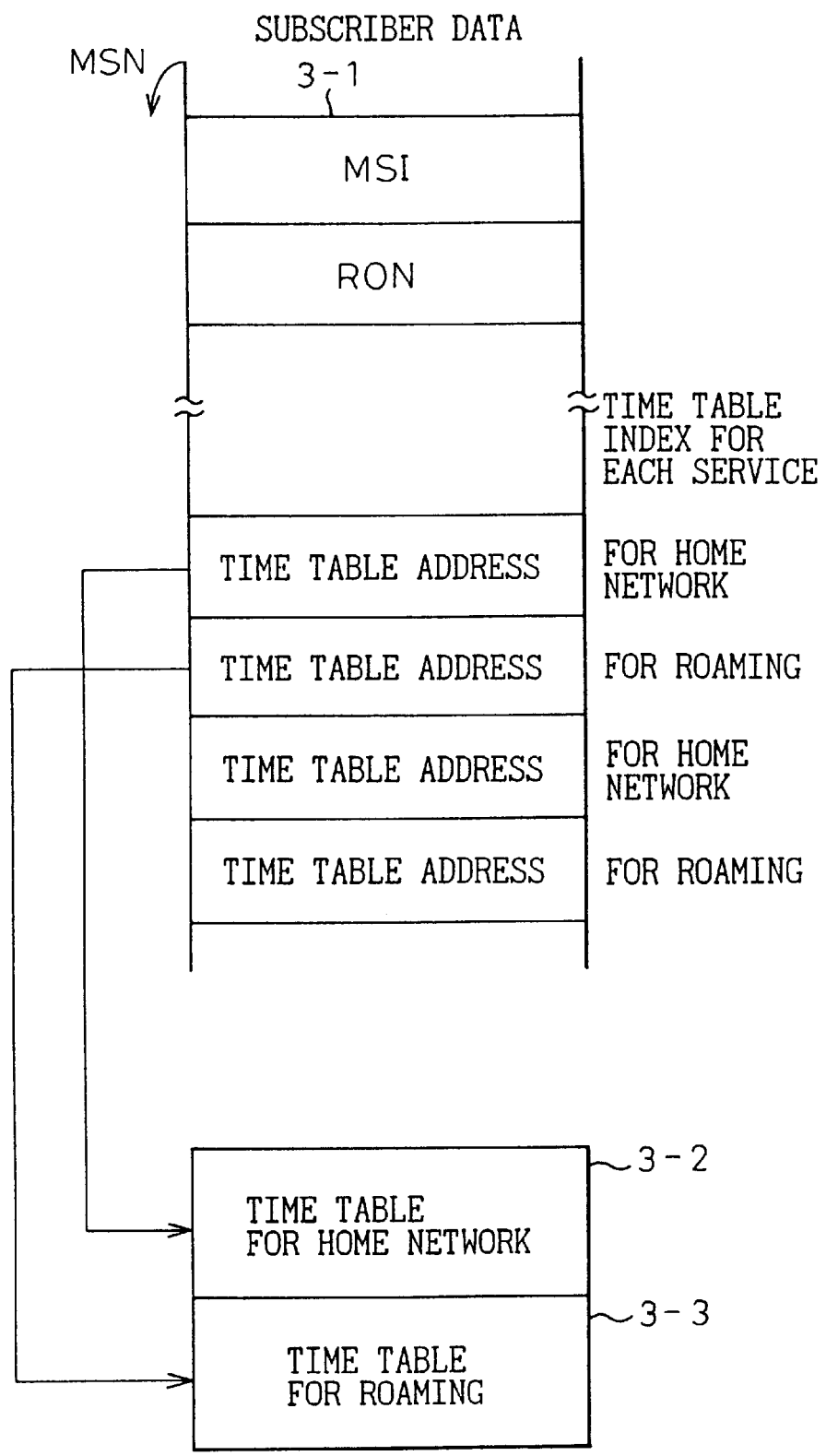
FIG. 3 is a diagram for explaining an extra service time management table according to an embodiment of the invention.

FIG. 3 is a diagram for explaining the time management table for the extra services according to an embodiment of the invention. The HLR, as shown in FIG. 3, has stored therein the subscriber data 3-1 including the time management table for the extra services corresponding to the set time.

The subscriber data 3-1 includes, in addition to the subscriber data such as the mobile station identifier MSI and the roaming number RON for each mobile station number MSN, the time table index for each extra service, while the time table index for each extra service includes the time table address for the local network (home communication network) and the roaming time table address.

The time table 3-2 for the local network (home communication network) has stored therein and holds the time information set in response to the request for extra services such as the day of the week, the date and hour and the time zone based on the standard time in the local network (home communication network). The roaming time table 3-3, on the other hand, has stored therein and holds the time information set in the time table for the local network (home communication network) as corrected by the time differential with the communication network of the roaming destination.

In the case where the mobile station sends a request to the GLR to change the extra service for the time table, the GLR transmits a request to the HLR to change the time table. Thus, the HLR has always stored therein the time table having the same set contents as the GLR.

In the roaming service between mobile communication networks, if there is a time differential between the home communication network of the mobile station and the destination communication network (visitor mobile service network) and the subscriber of the mobile station has registered the extra service using the time table, the communication network ID number information such as the common carrier number are exchanged between the home communication network and the destination communication network, and the time differential between the two communication networks is calculated. The differential of the time in the time table for the extra service among the subscriber data held in the home communication network is corrected, the time table with the time differential thus corrected is held in the home communication network and the destination communication network, and based on the time table with the time differential corrected, the call connection is carried out in each communication network with the various extra services corresponding to the set time.

Assume, for example, that the mobile station (MS) has set the call forwarding service in the home location register (HL) from 6:00 a.m. to the noon at the standard time of the home communication network.

After that, assume that the mobile station (MS) has registered the extra service of no night time call forwarding from 6:00 p.m. to 6:00 a.m. the next morning in the GLR of the destination communication network with a time differential of 12 hours. The time zone in which the call forwarding service is set in the home location register (HLR) corresponds to the time zone of no night time call forwarding in the destination communication network.

In the case where the extra service is executed based on the standard time of the destination communication network, a call from the home communication network to the destination (the roaming destination) communication network is not forwarded when the night time prevails in the destination communication network and the service of no night time forwarding is registered.

The subscriber moving between communication networks having a time differential, therefore, simply registers the extra service by designating the local time of the destination without setting the time by calculating the time differential.

Normally, the switching center of the home communication network executes the extra service such as the call forwarding in accordance with the original time table of HLR. The HLR has also stored therein the roaming table. Therefore, the switching center of the home communication network refers to the roaming time table, and if the time of no call forwarding service is prevailing, it is judged that the call forwarding is prohibited.

Also, normally, the initial address message (IAM) signal is required to be sent from the home communication network to the destination communication network. By referring to the roaming time table, however, the call connection process can be terminated within the home communication network, so that the unrequired call connection from the subscriber in the home communication network to the destination communication network can be reduced.

Depending on the contents of the extra service at the time set in the time table, it is sometimes necessary to attach additional information such as the international roaming connection number for the abbreviated dialing or the international roaming connection number for the hot line connection as a service of the transmission system.

These additional information can be placed under the control of the HLR or the GLR for each common carrier number recognized at the time of roaming.

The time differential can be corrected under the principal control of either the home communication network or the destination communication network. In the case where the time differential with the roaming destination is managed under the principal control of the home communication network in the HLR, the HLR produces a roaming time table with the time differential corrected from the original time table and transmits the roaming time table to the GLR of the destination communication network together with the other subscriber data. The HLR holds both the original time table and the roaming time table with the time differential corrected.

In the case where the time differential with the home communication network (the roaming source) is managed in the GLR under the principal control of the destination communication network, on the other hand, the GLR receives the subscriber data including the original time table and the ID number information of the home communication network from the HLR according to the sequence 6 shown in FIG. 1, corrects the time differential of the original time table from these information and produces and holds the roaming time table, while at the same time transmitting the roaming time table to the HLR.

The HLR adds the roaming time table sent thereto to the original time table, and thus holds both the original time table and the roaming time table.

Further, the time differential can be corrected based no the international standard time. For the benefit of the subscribers who are supposed to conduct communication with a service area having a time differential, a general-purpose location register for storing the particular subscriber data is newly installed. This general-purpose location register is so configured as to be accessible from the switching centers of the communication networks at the same time. The switching centers of the communication networks thus correct the time differential of the time table of the subscriber data read from the general-purpose location register to the standard time of each communication network and then executes the extra services.

Figure 4:
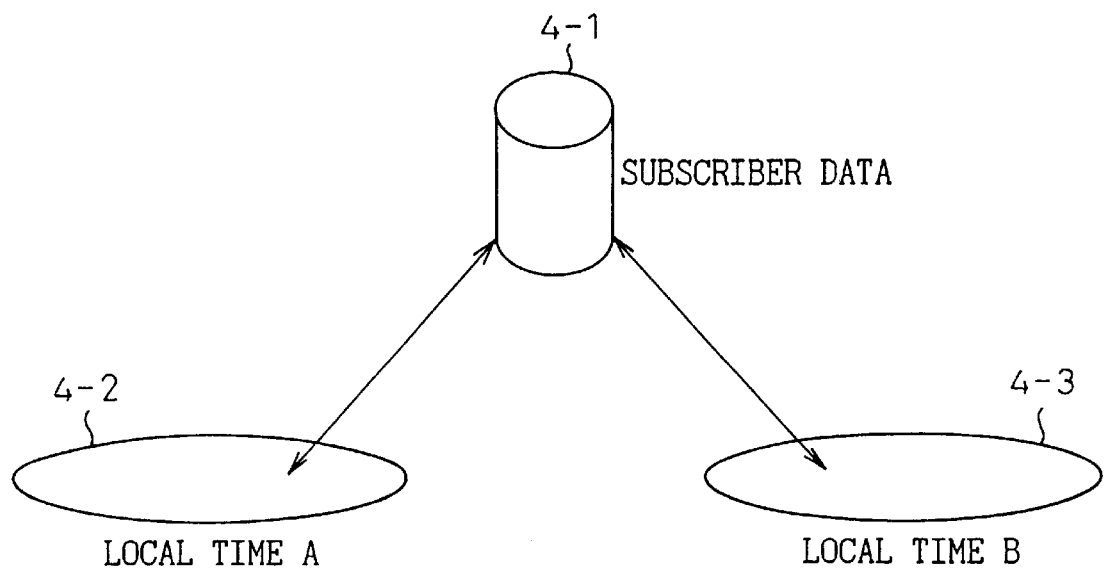
FIG. 4 is a diagram for explaining the time differential correction based on the international standard time according to an embodiment of the invention.

FIG. 4 is a diagram for explaining the time differential correction based on the international standard time according to an embodiment of the invention. In FIG. 4, numeral 4-1 designates a general-purpose location register, numeral 4-2 designates a communication network A at local time A, and numeral 4-3 designates a communication network B of local time B.

The general-purpose location register 4-1 has stored therein the subscriber data of the mobile station moving between the communication network A and the communication network B. The time table of the subscriber data stored in the general-purpose location register 4-1 is entirely controlled by the time based on the international standard time.

The communication networks A and B each hold the information on the time differential with the international standard time. When providing the extra service based on the time table of the subscriber data, the time differential is corrected when setting the time table read from the general-purpose location register 4-1 based on the information on the time differential with the international standard time, and thus the extra service is provided.

If, for example, the subscriber who has registered the call forwarding service with time zone designation has moved from the communication network A to the communication network B and has registered the no night time call forwarding in the communication network B, any information to be transferred by the call forwarding service is registered in the general-purpose location register 4-1. Upon registration of the no night time call forwarding, however, the communication network B registers the no night time call forwarding in the general-purpose location register 4-1 with the night time zone of the communication network B converted into the standard time zone.

According to the embodiments described above, the time differential is corrected in such a manner that the communication network ID number information such as the common carrier number information of each communication network are exchanged between the communication networks, and the time differential management data table is searched from the communication network ID number information thereby to determine and correct the time differential. Alternatively, the time differential can be determined by receiving the time information from the clock function built in the mobile station.

In the sequence 1 described above, at the time of registering the position of the mobile station, the time information of the clock function built in the mobile station is transmitted, together with the position registration request, to the VMSC 1-4. The VMSC 1-4 calculates the difference between the time information and the standard time of the VMSC 1-4 and transmits the difference to the GLR 1-3. The GLR 1-3, in turn, corrects the time differential under the principal control of the destination communication network (visitor mobile network) described above. Thus, the time set in the time table of the subscriber data read by the sequence 6 above is corrected, and the roaming time table is produced.

Further, the VMSC 1-4, after receiving the time information from the clock function built in the mobile station, notifies the grant of the position registration to the mobile station 1-5 from the VMSC 1-4 in the sequence 9 described above. At the same time, the standard time of the visitor mobile network is transmitted to the mobile station 1-5, so that the clock function built in the mobile station can be corrected to the standard time of the visitor mobile network.

It will thus be understood from the foregoing description that according to this invention, the time table of the subscriber in which the extra service corresponding to the set time is registered is corrected in time differential based on the standard time of the destination network, and in accordance with the time table corrected in time differential, the extra service is provided at the set time. In this way, the subscriber can enjoy the extra service corresponding to the set time without considering the time differential with the destination network.

Also, the home communication network including the time table with the time differential corrected to the standard time of the destination communication network provides the extra service in accordance with the time table with the corrected time differential. In this way, the call connections such as unrequired inquiries from the subscriber of the home communication network to the destination communication network can be reduced and so can the line occupancy ratio.

What is claimed is:

1. An extra communication service system with a time corrected by a time differential, for providing an extra service corresponding to a set time between communication networks using different standard times, comprising:

means for determining the time differential with a destination communication network of a subscriber based on communication ID number information exchanged between a home communication network of the subscriber who has registered the extra service and the destination communication network of the subscriber in response to a request for a location registration for the home communication network of the subscriber when the subscriber moves to a different service area;

means for producing and holding a time table based on a standard time of the destination communication network corrected based on a time differential with the destination communication network from a time set in an extra service time table in subscriber data stored in a home location register of the home communication network; and means for changing the time table of the standard time of the destination communication network in accordance with a request from the destination communication network to change the time table;

wherein the extra service corresponding to the set time is provided according to the time table of the standard time of the destination communication network.

2. An extra communication service system according to claim 1, wherein the home communication network of the subscriber who has registered said extra service includes means for determining the time differential with said destination communication network, means for producing and holding a time table of the standard time of the destination communication network with the time differential corrected, and means for transmitting the time table of the standard time of the destination communication network with the time differential corrected to the destination communication network.

3. An extra communication service system according to claim 1, wherein said destination communication network of the subscriber includes means for determining the time differential with the home communication network in which the subscriber has registered said extra service, means for producing and holding a time table of the standard time of the destination communication network with the time differential corrected, and means for transmitting the time table of the standard time of the destination communication network with the time differential corrected to the home network of said subscriber.

4. A communication service system with a time corrected by a time differential, for providing a service corresponding to a set time between communication networks using different standard times, comprising:

means for determining the time differential between the home communication network of a subscriber and the destination communication network of the subscriber in response to a request of a location registration for a home communication network of the subscriber when the subscriber moves to a different service area; and means for holding a time table based on the standard time of the destination communication network corrected based on the time differential with the destination communication network from the time set in a service time table in subscriber data stored in a home location register of the home communication network;

wherein the service corresponding to the set time is provided a time table of the standard time of the destination communication network.

5. A communication service system according to claim 4, wherein the home communication network of the subscriber who has registered said service includes means for determining the time differential with the destination communication network, means for producing a time table of the standard time of the destination communication network with the time differential corrected, and means for transmitting the time table of the standard time of the destination communication network with the time differential corrected to the destination communication network.

6. A communication service system according to claim 4, wherein said destination communication network of the subscriber includes means for determining the time differential with the home communication network in which the subscriber has registered said service, means for producing a time table of the standard time of the destination communication network with the time differential corrected, and means for transmitting the time table of the standard time of the destination communication network with the time differential corrected to the home communication network of said subscriber.

* * * * *